UNITED STATES PATENT OFFICE.

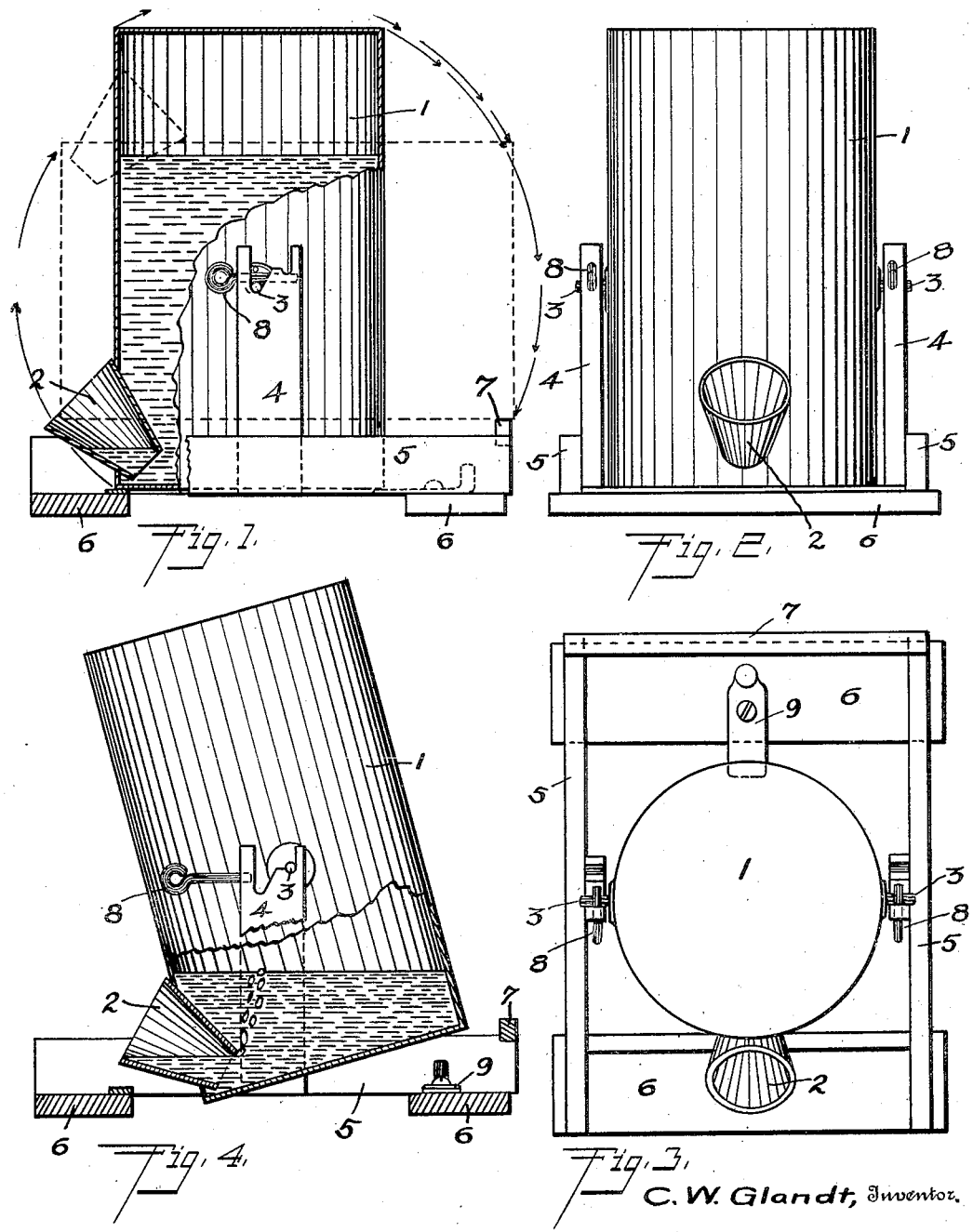

CLAUS W. GLANDT, OF BENNINGTON, NEBRASKA.

LIVE-STOCK-WATERING TANK.

No. 917,427.  Specification of Letters Patent.  Patented April 6, 1909.

Application filed January 28, 1908. Serial No. 413,131.

*To all whom it may concern:*

Be it known that I, CLAUS W. GLANDT, a citizen of the United States, and a resident of Bennington, in the county of Douglas and State of Nebraska, have invented certain new and useful Improvements in Live-Stock-Watering Tanks, of which the following is a specification.

My invention relates to automatic supply tanks for supplying watering troughs for live stock, and it is the object thereof to provide in a device of this kind means for tiltably supporting the tank whereby the same may be readily cleaned and filled and firmly supported, and to so combine the tank and trough that the trough furnishes a funnel-like opening for filling the tank.

A further object is to so form the trough that animals are not liable to get into the same.

A construction embodying my invention is illustrated in the accompanying drawings in which—

Figure 1 is a side elevation, partly in section, Fig. 2 is a front elevation, Fig. 3 is a plan view and Fig. 4 is a sectional elevation showing the tank in cleaning position.

In carrying out my invention I provide a tank 1, preferably made of sheet metal and of cylindrical form. The said tank is hermetically closed except at one side near the bottom thereof, where a conical or funnel-shaped trough 2 is inserted therein as shown in Figs. 1 and 4. The axis of the conical trough is disposed at such an incline with the axis of the tank that the upper edge of the opening at the inner end of the trough is slightly below the lower edge of the opening at the outer end thereof, when the tank is in the normal vertical position shown in said Fig. 1. On the sides of the tank at positions slightly below the transverse center line and to the rearward of the vertical center line thereof, when viewed in side elevation as in Fig. 1, are trunnions 3 which rest in suitable bearings provided in the vertically extending standards 4. Said standards are supported by a frame or base consisting of the side pieces 5 and the cross pieces 6 and 7. The trunnions are normally held within the bearings in the standards by the removable pins 8 extending through the standards above the trunnions as shown. When the tank is in the normal vertical position shown in Fig. 1 the lower front edge thereof rests upon the front cross piece 6 of the frame and the tank is in stable equilibrium by reason of the fact that the trunnions are so disposed as to bring the center of gravity of the tank between the trunnions and said front cross piece, but to prevent the possibility of the tank being tilted backward by animals pushing against the same the latch 9 is provided. The said latch consists of a flat piece of metal, pivotally connected with the rear cross piece 6 of the frame, and having an upturned lip at one end thereof by which it may be turned on its pivot to bring the flat end thereof under the lower rearward edge of the tank, as shown.

When it is desired to fill the tank the latch 9 is turned aside and the tank is then tilted backward, swinging on the trunnions as indicated by the arrows in Fig. 1, to the horizontal position shown by dotted lines. When in this position the rearward end of the tank rests on the cross piece 7 of the frame, and the tank is in stable equilibrium by reason of the eccentric position of the trunnions which brings the center of gravity of the tank between the trunnions and the cross piece. When in the horizontal position the funnel-shaped trough furnishes a convenient filling opening.

In the standards 4 above the pins 8 are additional bearings in which the trunnions 3 may be placed, as shown in Fig. 3, when it is desired to clean and empty the tank. When the trunnions are in the upper bearings the tank may be tilted either forward or backward. To clean the tank and remove any sediment or deposit from the bottom thereof, the same is rocked back and forth to stir up the sediment and cause it to be temporarily held in suspension. The tank is then tilted forward as shown in Fig. 3 to bring the edge of the outer end of the trough below the level of the upper edge of the inner end thereof, whereupon the water flows out of the tank, being displaced by the air which enters in bubbles through the inner end of the conical trough.

It will be observed that when the tank is in normal position the water will stand in the trough at a level very slightly above the inner opening thereof, and as the said level is lowered air enters the tank to displace a sufficient amount of water therefrom to restore the level to the normal. It will also be observed that on account of the relatively small size of the trough and the curved and sloping bottom thereof it is practically impossible for animals to get into the same and pollute the water therein.

Now, having described my invention, what I claim and desire to secure by Letters Patent is:

1. In a device of the class described, a tank having trunnions disposed thereon below and to one side of the transverse and vertical center lines thereof, standards having bearings therein adapted to receive the said trunnions, a frame supporting said standards, and cross pieces on said frame adapted to be engaged by and support the tank in either horizontal or vertical position.

2. In a device of the class described, a supporting frame, a tank pivotally mounted on said frame and adapted to be turned from a vertical to a horizontal position, and a funnel-shaped trough open at both ends having the smaller end thereof inserted in the side of the tank near one end thereof, the axis of the trough being at such an incline to the tank that the opening at the outer end thereof is at a higher level than the opening at the inner end thereof when the tank is in vertical position, the opening through said trough being the sole opening to the tank.

3. In a device of the class described, a tank, a trough connected therewith, trunnions disposed on the sides of the tank, standards having bearings formed therein at two different levels and adapted to receive the said trunnions, and a frame carrying said standards, there being means on said frame engaged by one edge of the tank when the same is in vertical position and the trunnions are in the lower bearings, said means preventing the tank from being tilted forwardly but permitting the same to be tilted backwardly to a horizontal position, the arrangement of the upper bearings being such that when the trunnions are therein the tank may be tilted either forwardly or backwardly.

In testimony whereof I have hereunto subscribed my name in the presence of two witnesses.

CLAUS W. GLANDT.

Witnesses:
　Roy G. Kratz,
　George Ernst.